US012651754B2

(12) United States Patent
Heo

(10) Patent No.: US 12,651,754 B2
(45) Date of Patent: Jun. 9, 2026

(54) MESOPOROUS SUPPORT FOR A CATALYST FOR A FUEL CELL AND METHOD OF PRODUCING THEREOF

(71) Applicants: Hyundai Motor Company, Seoul (KR); Kia Corporation, Seoul (KR)

(72) Inventor: Young Jung Heo, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 731 days.

(21) Appl. No.: 18/078,955

(22) Filed: Dec. 10, 2022

(65) Prior Publication Data

US 2023/0369606 A1      Nov. 16, 2023

(30) Foreign Application Priority Data

May 10, 2022    (KR) ........................ 10-2022-0056939

(51) Int. Cl.
*H01M 4/00*      (2006.01)
*H01M 4/86*      (2006.01)
*H01M 4/88*      (2006.01)
*H01M 4/90*      (2006.01)

(52) U.S. Cl.
CPC ....... *H01M 4/8817* (2013.01); *H01M 4/8605* (2013.01); *H01M 4/8803* (2013.01); *H01M 4/9083* (2013.01)

(58) Field of Classification Search
CPC ............. H01M 4/88; H01M 4/86; H01M 4/90
See application file for complete search history.

(56) References Cited

FOREIGN PATENT DOCUMENTS

| EP | 3168905 A1 * | 5/2017 | .......... H01M 10/052 |
| KR | 10-2017-0097579 A | 8/2017 | |
| KR | 10-1978187 B1 | 5/2019 | |
| KR | 10-2311711 B1 | 10/2021 | |
| WO | WO-2016113952 A1 * | 7/2016 | .......... C01B 32/205 |

OTHER PUBLICATIONS

Caballero et al.,Carbon Composites, May 2017, See the Abstract. (Year: 2017).*
Akasaka et al., Carbon Material and Nonaqueous Secondary Battery Using Carbon Material, Jul. 2016, See the Abstract. (Year: 2016).*
Biniak, S. et al., "Influence of High Temperature Treatment of Granular Activated Carbon on its Structure and Electrochemical Behavior in Aqueous Electrolyte Solution", Journal of Materials Research, vol. 25, No. 8 (Aug. 2010) 13 pages.
Seveilla, M. et al., "Catalytic Graphitization of Templated Mesoporous Carbons", Carbon, 44 (2006) pp. 468-474.
Janzen, T. et al., "The Effect of Alcohols as the Third Component on Diffusion in Mixtures of Aromatics and Ketones", RSC Adv., 2018, 8, 10017, 6 pages.

* cited by examiner

*Primary Examiner* — Tiffany Legette
*Assistant Examiner* — Monique M Wills
(74) *Attorney, Agent, or Firm* — Fox Rothschild LLP

(57) ABSTRACT

Disclosed are a mesoporous support for a catalyst of a fuel cell, which includes a graphite layer formed only on its surface and a method producing the same. The support may include a substrate; a graphite layer in a crystalline form and formed on a surface of a substrate, and further include a first pore having an average pore size of less than about 2 nm and a second pore having an average pore size of about 2 nm to 50 nm.

19 Claims, 5 Drawing Sheets

91

MESOPOROUS SUPPORT FOR A CATALYST FOR A FUEL CELL AND METHOD OF PRODUCING THEREOF

CROSS-REFERENCE TO RELATED APPLICATION

The present application claims priority to Korean Patent Application No. 10-2022-0056939, filed May 10, 2022, the entire contents of which is incorporated herein for all purposes by this reference.

TECHNICAL FIELD

The present disclosure relates to a mesoporous support for a catalyst of a fuel cell and a method of producing the same.

BACKGROUND

A support included an electrode of an electrochemical cell is a very important material for improving the performance of the electrochemical cell by increasing a surface area of the catalyst and a loaded amount of an active metal. A typical support may have an average pore size of less than about 2 nm, a specific surface area of 1,000 $m^2/g$ or greater, and includes an amorphous material. The pore of the typical support are small to load the active metal in nano-sized. The support with small pores may reduce the loading efficiency of the active metal and increases the resistance of mass transfer. In addition, due to the irregularity of the surface of the support, there is a problem in that durability of the electrochemical cell is deteriorated during abnormal or long-term operations.

SUMMARY

In preferred aspects, provided is a mesoporous support for a catalyst of a fuel cell, which includes a graphite layer formed only on the surface thereof.

The objective of the present disclosure is not limited to the objective mentioned above. The objectives of the present disclosure will become more apparent from the following description and will be realized by means and combinations thereof described in the claims.

A term "mesoporous" or "mesopores" as used herein refers to a structure of material having a plurality of pores having a size (diameter) range of about 2 to 50 nm, in compliance to the IUPAC nomenclature. To the contrary, a term "microporous" or "micropores" as used herein refers to a state or material having a plurality of pores having a size (diameter) range of greater than about 50 nm. Further, a term "nanoporous" or "nanopores" refers to a structure of material having a plurality of pores having a size (diameter) range in nanometers, e.g., about 100 nm or less.

In an aspect, provided is a support for a catalyst of a fuel cell, which may include a core; a graphite layer in which is crystalline on a surface of the core; a first pore having an average pore size of less than about 2 nm; and a second pore having an average pore size of about 2 to 50 nm. In addition, the support may satisfy Formula 1.

$$\frac{V_2}{V_0} \times 100 \geq 40 \qquad \text{[Formula 1]}$$

wherein $V_0$ may be a total pore volume of the support, and $V_2$ may be a volume of the second pore.

The graphite layer may have a thickness in the range of about 1 to 10 nm.

The graphite layer may have an interlayer distance ($d_{002}$) in the range of about 3.70 Å or less.

The graphite layer may include crystallites having a vertical size (Lc) in a range of about 13.0 to 13.7 Å.

The graphite layer may include crystallites having a horizontal size (La) in a range of about 42.4 to 100.5 Å.

The support may have the total pore volume of about 0.78 $cm^3/g$ or greater.

In an aspect, provided is a method of producing a support for a catalyst of a fuel cell. The method may include preparing a dispersion including an amorphous carbon particle; preparing an admixture including a salt of a transition metal and the dispersion; producing a carbon-transition metal composite from the admixture; heat-treating the carbon-transition metal composite; and removing the transition metal from heat-treated carbon-transition metal composite.

The amorphous carbon particle may include activated carbon, carbon black, carbon nanotubes, graphene, and a combination thereof.

The dispersion may be prepared by preparing a first admixture including the amorphous carbon particle and a first solvent, adjusting a pressure of the fluid to about 600 to 1,500 bar, and dispersing the amorphous carbon particle by causing the fluid to pass through a nozzle having a diameter of about 50 to 200 μm at a flow rate of about 50 to 500 ml/min. The processes above may be preferably performed one or more times to prepare the dispersion.

After the dispersing the amorphous carbon particle, the dispersion may be treated by replacing the first solvent with a second solvent including acetone, ethanol, or combinations thereof.

The transition metal may include iron (Fe), nickel (Ni), cobalt (Co), manganese (Mn), ruthenium (Ru), iridium (Ir), tungsten (W), titanium (Ti), and combinations thereof.

The salt of the transition metal may be added in an amount of about 200 to 1,000 parts by weight based on 100 parts by weight of the amorphous carbon particle.

The carbon-transition metal composite may be obtained by reacting the admixture by stirring the reactant at a temperature of about 60° C. to 120° C. for about 5 to 24 hours.

The carbon-transition metal composite may be heat-treated at a temperature of about 700° C. to 1,500° C. in an inert gas atmosphere for about 1 hour to 12 hours.

The heat-treated carbon-transition metal composite may be treated with an acid solution at a temperature of about 60° C. to 120° C. for about 6 to 48 hours to remove the transition metal.

According to various exemplary embodiments of the present disclosure, a mesoporous support for a catalyst of a fuel cell in which the support has a graphite layer formed only on the surface may be obtained.

Also provided is an electrode of an electrochemical cell including the support described herein.

Further, provided is an electrochemical cell (e.g., fuel cell) including the electrode that includes the support described herein.

In another aspect, provided is a vehicle that may include the electrochemical cell (e.g., fuel cell) as described herein.

Other aspects of the invention are disclosed infra.

DETAILED DESCRIPTION

Figure 1:
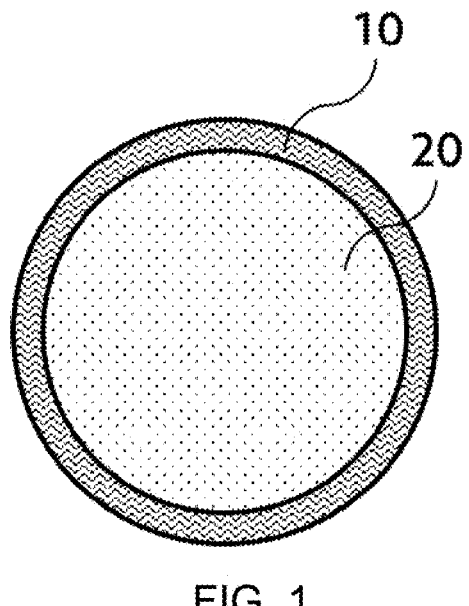
FIG. 1 shows an exemplary support for a catalyst of a fuel cell according to an exemplary embodiment of the present disclosure.

The above objectives, other objectives, features, and advantages of the present disclosure will be easily understood through the following preferred embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In this specification, the terms "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where another part is in the middle. Conversely, when a part of a layer, film, region, plate, etc., is said to be "under" another part, this includes not only cases where it is "directly under" another part but also a case where another part is in the middle.

Unless otherwise specified, all numbers, values, and/or expressions expressing quantities of ingredients, reaction conditions, polymer compositions, and formulations used herein contain all numbers, values, and/or expressions in which such numbers essentially occur in obtaining such values, among others. Since they are approximations reflecting various uncertainties in the measurement, it should be understood as being modified by the term "about" in all cases. Further, unless specifically stated or Obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 shows a support for a catalyst of a fuel cell according to the present disclosure. The support may include a graphite layer 10 in which is crystalline on a surface thereof. The core 20 of the support may include an amorphous carbon particle.

The method of producing the support may include: preparing a dispersion including the amorphous carbon particle; preparing an admixture including a salt of a transition metal to the dispersion; producing a carbon-transition metal composite, e.g., by causing a reaction of the admixture; heat-treating the carbon-transition metal composite; and removing the transition metal from heat-treated carbon-transition metal composite.

The support obtained by the above manufacturing method may have excellent durability because the graphite layer 10 is formed on its surface. In addition, the support may include micropores and mesopores, but the high ratio of the mesopores allows the more active metal to be loaded, and the resistance of mass transfer is low, so that the efficiency of the catalyst may be improved.

Hereinafter, the manufacturing method will be described in more detail.

The amorphous carbon particle may include activated carbon, carbon black, carbon nanotubes, grapheme, or combinations thereof.

Since the amorphous carbon particle have a property of aggregation, a process of pulverizing or dispersing is necessarily required for uniform dispersion and increase of a surface area. Particularly, using a high-pressure disperser, the amorphous carbon particles may be evenly dispersed.

Figure 2:
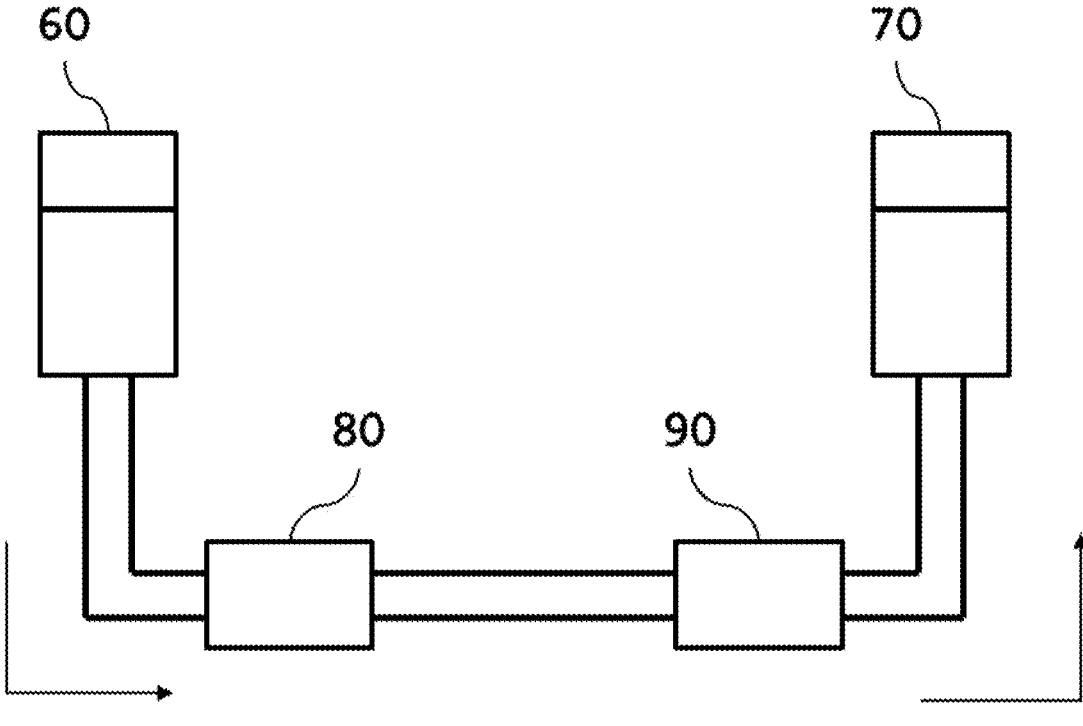
FIG. 2 shows an exemplary high-pressure disperser according to an exemplary embodiment of the present disclosure.
Figure 3:
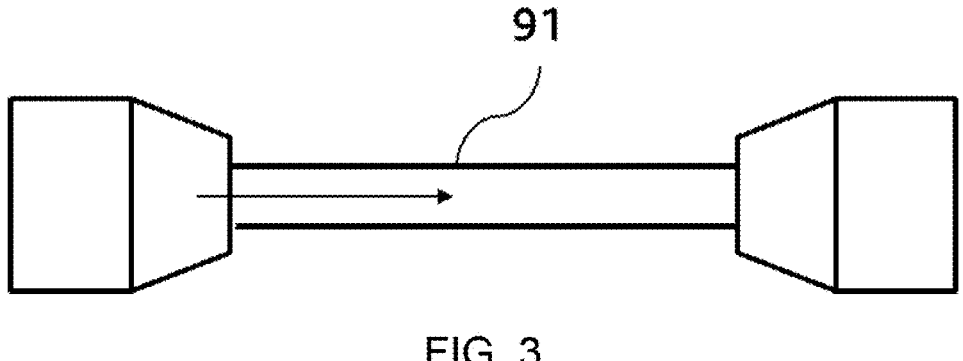
FIG. 3 shows an exemplary nozzle provided in a chamber according to an exemplary embodiment of the present disclosure.

FIG. 2 shows a high-pressure disperser. FIG. 3 shows a nozzle provided in the chamber. Referring to FIGS. 2 and 3, the high-pressure disperser may include an inlet part 60, an outlet part 70, a pump 80 positioned between the inlet part 60 and the outlet part 70, and a chamber 90 provided with the nozzle 91. For reference, the producing method, according to the present disclosure, does not necessarily use the high-pressure disperser of FIG. 2 and thus should not be interpreted as being limited thereto.

The fluid, including the amorphous carbon particle and a first solvent, may move from the inlet part 60 toward the outlet part 70 by the pressure applied by the pump 80. In the process, the fluid may pass through the nozzles 91, which are small gaps provided in the chamber 90, at high speed. At this time, a pressure of the fluid is rapidly lowered, and a supersonic flow velocity is formed. Accordingly, impact, cavitation, shear force, and the like are applied to the amorphous carbon particle in the fluid to pulverize and/or disperse the amorphous carbon particles.

When the fluid passes through the nozzle 91, the amorphous carbon particle are impacted by the collision between particles and the wall of the nozzle 91, thereby pulverizing them.

The cavitation is a phenomenon in which bubbles are formed when the flow rate is high. A surface of a high-speed moving object creates a low-pressure part by Bernoulli's theorem. When the pressure is less than the saturated vapor pressure, water vapor may be generated, and at the same time, the gas contained in the solvent may be released to form a cavity. The cohesive force between the amorphous carbon particle may be reduced by the cavity so that the amorphous carbon particle are evenly dispersed.

The fluid passing through the nozzle 91 may have a fast-flowing part and a slow-flowing part depending on the size of the nozzle 91 and resistance such as friction on the wall. Due to the speed difference, a shear force may be applied to the amorphous carbon particle, which releases agglomeration of the amorphous carbon particle so that the amorphous carbon particle can be evenly dispersed.

The dispersion may be prepared by preparing a first admixture including the amorphous carbon particle and the first solvent, adjusting a pressure of the fluid to about 600 bar to 1,500 bar, and then passing the fluid through a nozzle having a diameter of about 50 to 200 μm. The above processes may be performed one or more times to prepare the dispersion. When the above conditions are exceeded, impact, cavitation, shear force, and the like may not properly act on the amorphous carbon particle, and thus dispersibility of the amorphous carbon particle may be degraded.

On the other hand, after dispersing the amorphous carbon particle, the first solvent may be replaced with a second solvent including acetone, ethanol, or combinations thereof. When the first solvent is replaced with the second solvent, the self-diffusion coefficient may be increased so that the second solvent in the amorphous carbon particle may penetrate deeply, which leads to an increase in the loaded amount of the salt of the transition metal.

A method of replacing the first solvent and the second solvent is not particularly limited. For example, the first solvent may be removed while passing the fluid through the filtration membrane, and the second solvent may be slowly added for replacement, or the second solvent may be slowly added while evaporating the first solvent for replacement.

Thereafter, the salt of the transition metal may be loaded on a surface of the amorphous carbon particle in order to reduce the crystallization temperature of the amorphous carbon particle. The salt of the transition metal may be injected into the dispersion to prepare an admixture, and the admixture may be reacted to produce a carbon-transition metal composite.

The transition metal may include one or more selected from a group consisting of iron (Fe), nickel (Ni), cobalt (Co), manganese (Mn), ruthenium (Ru), iridium (Ir), tungsten (W), and titanium (Ti).

The salt of the transition metal may include nitrate, sulfate, carbonate, or halogen salt of the transition metal. In addition, the salt of the transition metal may be a hydrate or anhydrate.

The admixture may be prepared by adding an amount of about 200 to 1,000 parts by weight of the salt of the transition metal based on 100 parts by weight of the amorphous carbon particle. When the input amount of the salt is less than 200 parts by weight, the loaded amount of the salt may not be sufficient. When the input amount of the salt is greater than 1,000 parts by weight, a side reaction between the amorphous carbon particle and the transition metal may occur due to an excessive amount of the transition metal, and thus the effect of graphitization may be degraded.

The admixture may be stirred and reacted at a temperature of about 60° C. to 120° C. for about 5 to 24 hours to produce the carbon-transition metal composite. When the reaction temperature is lower than 60° C. or the reaction time is less than 5 hours, the penetration rate of transition metal ions may be reduced. When the reaction temperature is higher than 120° C. or the reaction time is greater than 24 hours, the amorphous carbon particle and the transition metal ions may be thermally decomposed or chemically decomposed, thereby reducing the yield of the composite.

The carbon-transition metal composite may include the amorphous carbon particle and the transition metal penetrating a surface of the amorphous carbon particle and loaded on the surface.

Drying the carbon-transition metal composite may be performed to remove remaining solvent before heat-treating the carbon-transition metal composite.

Thereafter, the carbon-transition metal composite may be heat-treated to form the graphite layer on the surface of the amorphous carbon particle.

The carbon-transition metal composite may be heat-treated at a temperature of about 700° C. to 1,500° C. in an inert gas atmosphere for about 1 hour to 12 hours. When the reaction temperature is less than 700° C. or the reaction time is less than 1 hour, the graphite layer may not be formed. When the heat treatment temperature is greater than 1,500° C. or the heat treatment time is greater than 12 hours, the inside of the amorphous carbon particle may be graphitized to reduce porosity.

The inert gas atmosphere is not particularly limited and may be formed of, for example, argon gas.

The heat-treated carbon-transition metal composite may be added to the acid solution to remove the transition metal. As the transition metal, which is a nano-sized particle, may be removed, mesopores may be formed in the support.

The heat-treated carbon-transition metal composite may be added to the acid solution and treated at a temperature of about 60° C. to 120° C. for about 6 to 48 hours to remove transition metal. When the treatment temperature is less than 60° C. or the treatment time is less than 6 hours, the transition metal may remain, and the ratio of mesopores may not be sufficiently increased. When the treatment temperature is greater than 120° C. or the treatment time is greater than 48 hours, the pores on the surface of the support may be collapsed.

The support produced as described above may include the graphite layer 10 in which is crystalline on a surface of the core, the first pore having an average pore size of less than about 2 nm and the second pore having an average pore size of about 2 nm to 50 nm, and may satisfy the following Formula 1.

$$\frac{V_2}{V_0} \times 100 \geq 40 \qquad \text{[Formula 1]}$$

In Formula 1, $V_0$ may be the total pore volume of the support, and $V_2$ may be the volume of the second pore.

The graphite layer 10 may have a thickness in a range of about 1 nm to 10 nm. When the thickness of the graphite layer 10 is less than 1 nm, the effect of improving the durability of the support may be insignificant, and when the thickness of the graphite layer is more than 10 nm, the porosity of the support may be deteriorated.

Figure 4:
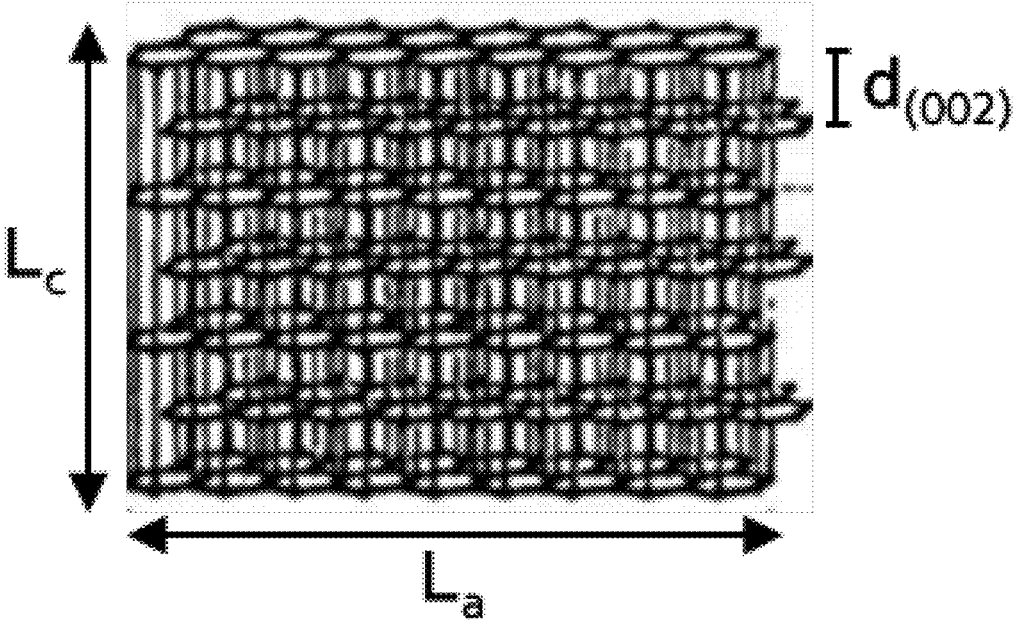
FIG. 4 shows a reference diagram for explaining the graphitization degree of the graphite layer according to an exemplary embodiment of the present disclosure.

FIG. 4 shows a reference diagram for explaining the graphitization degree of the graphite layer 10. The graphite layer 10 may have an interlayer distance d002 in a range of about 3.70 Å or less, a vertical size Lc of crystallites in a range of about 13.0 to 13.7 Å, and a horizontal size La of crystallites in a range of about 42.4 to 100.5 Å. The lower limit of the interlayer distance d002 is not particularly limited, and may be, for example, about 1 Å or more, about 1.5 Å or more, or about 2 Å or more.

Formula 1 means that the proportion of the second pore in the total pore volume of the support is 40% or greater. Since the support has a high ratio of the second pore having a meso-size, the support may more easily support an active metal and has low resistance for material transfer, thereby significantly improving the efficiency of a catalyst.

The total pore volume of the support may be about 0.78 cm³/g or greater, and the volume of the second pore of the support may be about OA cm³/g or greater. The upper limit of the total pore volume is not particularly limited, and may be, for example, about 3 cm³/g or less, about 2.5 cm³/g or less, about 2 cm³/g or less, about 1.5 cm³/g or less, or about 1 cm³/g or less. The upper limit of the second pore volume is not particularly limited, and may be, for example, about 3 cm³/g or less, about 2.5 cm³/g or less, about 2 cm³/g or less, about 1.5 cm³/g or less, or about 1 cm³/g or less.

EXAMPLE

Hereinafter, another form of the present disclosure will be described in more detail through the following examples. The following examples are merely illustrative to help the understanding of the present disclosure, and the scope of the present disclosure is not limited thereto.

Example 1

2 g of an amorphous carbon particle were added to 500 ml of isopropyl alcohol and stirred for about 2 hours. After the stirring was completed, the isopropyl alcohol was replaced with ethanol to prepare a dispersion.

10 g of Ni(NO₃)₂·6H₂O was added to the dispersion to prepare an admixture, and the admixture was reacted at about 80° C. for about 24 hours with stirring. The resultant was filtered and dried in a vacuum oven at about 80° C. for about 12 hours to obtain a carbon-transition metal composite.

The carbon-transition metal composite was heat-treated at about 900° C. in an argon gas atmosphere for about 3 hours.

The heat-treated resultant was put in 1 M hydrochloric acid (HCl) and stirred at about 80° C. for about 24 hours to remove the transition metal and dried to complete the support.

Example 2

A support was produced in the same manner as in Example 1, except that the heat treatment time was increased to 6 hours.

Example 3

A fluid was prepared by adding 2 g of an amorphous carbon particle to 500 ml of isopropyl alcohol. After adjusting the pressure of the fluid to 600 to 1,500 bar using a high-pressure reactor (Nano disperser, Ilshin Autoclave), the process of passing through a nozzle having a diameter of 50 to 200 μm at a flow rate of about 500 ml/min was repeated three times. Isopropyl alcohol was replaced with ethanol in the resultant to obtain a dispersion.

10 g of Ni(NO₃)₂·6H₂O was added to the dispersion to prepare a reactant, and the reactant was reacted at a temperature of about 80° C. for about 24 hours with stirring. The resultant was filtered and dried in a vacuum oven at a temperature of about 80° C. for about 12 hours to obtain a carbon-transition metal composite.

The carbon-transition metal composite was performed with heat treatment at a temperature of about 900° C. in an argon gas atmosphere for about 6 hours.

The heat-treated resultant was put in 1 M hydrochloric acid (HCl) and stirred at a temperature of about 80° C. for about 24 hours to remove the transition metal and dried to complete the support.

Example 4

A support was produced in the same manner as in Example 1, except that acetone was used as the second solvent.

Example 5

A support was produced in the same manner as in Example 2, except that acetone was used as the second solvent.

Example 6

A support was prepared in the same manner as in Example 3, except that acetone was used as the second solvent.

Comparative Example 1

Amorphous carbon particles were prepared as a support.

Comparative Example 2

Amorphous carbon particles were treated at a temperature of 900° C. for 6 hours to prepare a support.

The producing conditions of Examples 1 to 6 and Comparative Example 2 are summarized in Table 1 below.

TABLE 1

| Category | Dispersion type | The second solvent | Heat treatment temperature [° C.] | Heat treatment time [hr] |
|---|---|---|---|---|
| Comp. Exam. 2 | Agitation | Ethanol | 900 | 6 |
| Exam. 1 | Agitation | Ethanol | 900 | 3 |
| Exam. 2 | Agitation | Ethanol | 900 | 6 |
| Exam. 3 | high pressure dispersion | Ethanol | 900 | 6 |
| Exam. 4 | Agitation | Acetone | 900 | 3 |
| Exam. 5 | Agitation | Acetone | 900 | 6 |
| Exam. 6 | high pressure dispersion | Acetone | 900 | 6 |

The surface layer of the support is composed of a plurality of layers, and X-ray diffraction (XRD) was performed to analyze the structure of the surface layer of the support. The interlayer distance (d002), which is an index for recognizing the graphitization degree of the graphite layer, was calculated by Bragg's law, and the vertical size Lc and horizontal size La of the crystallites were calculated by the Schemer Equation. The results are shown in Table 2 below.

TABLE 2

| Item | Comp. Exam. 1 | Comp. Exam. 2 | Exam. 1 | Exam. 2 | Exam. 3 | Exam. 4 | Exam. 5 | Exam. 6 |
|---|---|---|---|---|---|---|---|---|
| $d_{(002)}$[Å] | 3.67 | 3.66 | 3.66 | 3.66 | 3.69 | 3.66 | 3.65 | 3.65 |
| $L_c$[Å] | 13.1 | 13.2 | 13.1 | 13.1 | 13.2 | 13.3 | 13.5 | 13.7 |
| $L_a$[Å] | 35.4 | 45.8 | 42.4 | 92.8 | 91.3 | 71.2 | 83.8 | 100.5 |

As shown in Examples 2 to 6, the graphitization degree was considerably enhanced compared to the horizontal size La of the crystallite compared to Comparative Example 2.

Figure 5A:
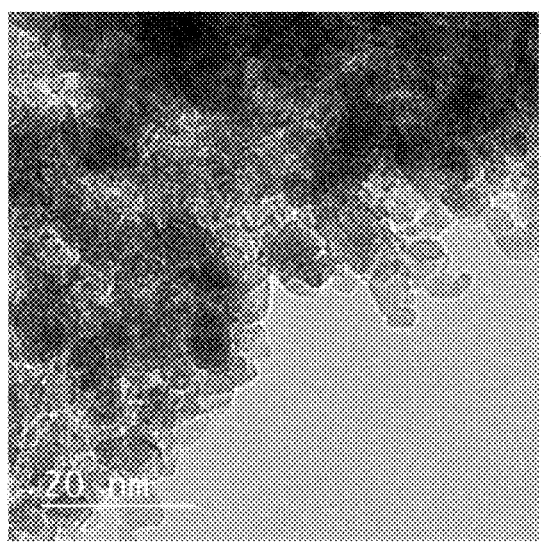
FIG. 5A shows a result of analyzing the support according to Comparative Example 1 using a transmission electron microscope (TEM)
Figure 5B:
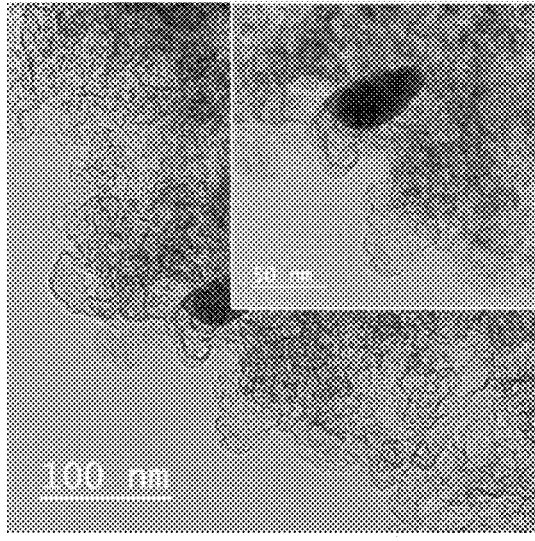
FIG. 5B shows a result of analyzing the support according to Example 5 using a transmission electron microscope (TEM)
Figure 5C:
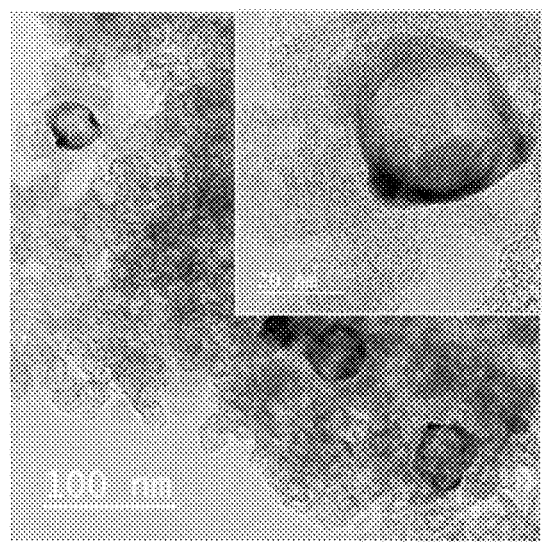
FIG. 5C shows a result of analyzing the support according to Example 6 using a transmission electron microscope (TEM).

FIG. 5A shows a result of analyzing the support according to Comparative Example 1 using a transmission electron microscope (TEM). FIG. 5B shows a result of analyzing the support according to Example 5 using a transmission electron microscope (TEM). FIG. 5C shows a result of analyzing the support according to Example 6 using a transmission electron microscope (TEM). Meanwhile, Table 3 is the result of measuring the thickness of the graphite layer based on the results of transmission electron microscopy analysis of the supports according to Comparative Example 2 and Examples 1 to 6. The thickness was measured and indicated in 50 experimental groups observed in the analysis image of each sample.

TABLE 3

| Item | Comp. Exam. 1 | Comp. Exam. 2 | Exam. 1 | Exam. 2 | Exam. 3 | Exam. 4 | Exam. 5 | Exam. 6 |
|---|---|---|---|---|---|---|---|---|
| Graphite layer Thickness [nm] | — | <1 | 1 to 1.5 | 1 to 2 | 1 to 3 | 1 to 2 | 2 to 3 | 4 to 6 |

As shown in FIG. 5A, Comparative Example 1 did not show the graphite layer because Comparative Example 1 was the amorphous carbon particles themselves that are not heat treated. As shown in FIGS. 5B and 5C, a graphite layer was formed on the surface of the supports of Examples 5 and 6. Further, according to Table 3 the thickness of the graphite layer was increased by performing high-pressure dispersion through the results of Examples 2 and 3, and Examples 5 and 6.

In order to evaluate the porosity of the supports of Comparative Examples 1 and 2, Examples 3 and 6, 77 K/$N_2$ gas adsorption analysis was performed. The total pore volume was obtained using an adsorption curve up to a relative pressure of 0.990, and the mesopore volume was derived using the value of the desorption curve through the Barret-Joyner-Halenda (BJH) method. Mesoporosity was calculated by dividing the mesopore volume by the total pore volume and then multiplying by the percentage. The results are shown in Table 4 below. In Table 4, micropores refer to first pores having an average pore size of less than 2 nm, and mesopores refer to second pores having an average pore size of 2 nm to 50 nm.

Meanwhile, the specific surface area was derived using the Brunauer-Emmett-Teller (BET) equation.

TABLE 4

| Category | Specific surface area [m²/g] | Total pore volume [cm]³/g] | Micropore volume [cm]³/g] | Mesopore volume [cm]³/g] | Meso-porosity [%] |
|---|---|---|---|---|---|
| Comparative Example 1 | 1,117 | 0.72 | 0.51 | 0.21 | 29.1 |
| Comparative Example 2 | 836 | 0.59 | 0.41 | 0.18 | 30.5 |
| Example 3 | 664 | 0.78 | 0.34 | 0.44 | 56.4 |
| Example 6 | 706 | 0.99 | 0.36 | 0.63 | 63.6 |

Comparative Example 1 had a large specific surface area but low mesoporosity. In Comparative Example 2, the total pore volume, micropore volume, and mesopore volume were all reduced compared to Comparative Example 1. In Examples 3 and 6, since the graphite layer was formed by heat treatment, the specific surface area and the micropore volume were reduced compared to Comparative Example 1, but the mesopores volume and the mesoporosity were significantly increased.

As described above in detail, the scope of the present disclosure is not limited to the experimental examples and embodiments, and various modifications and improvements of those skilled in the art defined in the following claims are also included in the scope of the present disclosure.

What is claimed is:

1. A fuel cell comprising:
a catalyst comprising a support in the fuel cell and an active metal loaded on the support;
wherein the support comprises;
    a core comprising an amorphous carbon particle;
    a graphite layer disposed on a surface of the core, wherein the graphite layer is crystalline; and
    a first pore having an average pore size of less than about 2 nm, and
    a second pore having an average pore size of about 2 nm to 50 nm,
wherein the support satisfies Formula 1, $$\frac{V_2}{V_0} \times 100 \geq 40 \qquad \text{[Formula 1]}$$

wherein $V_0$ is a total pore volume of the support, and $V_2$ is a volume of the second pore.

2. The fuel cell of claim 1, wherein the graphite layer has a thickness in a range of about 1 to 10 nm.

3. The fuel cell of claim 1, wherein the graphite layer has an interlayer distance d002 of about 3.70 Å or less.

4. The fuel cell of claim 1, wherein the graphite layer comprises crystallites having a vertical size Lc in a range of about 13.0 to 13.7 Å.

5. The fuel cell of claim 1, wherein the graphite layer comprises crystallites having a horizontal size La in a range of about 42.4 to 100.5 Å.

6. The fuel cell of claim 1, wherein the total pore volume of the support is about 0.78 $cm^3/g$ or greater.

7. A method producing a support for a catalyst of a fuel cell comprising:
    preparing a dispersion comprising an amorphous carbon particle;
    preparing an admixture comprising a salt of a transition metal and the dispersion;
    producing a carbon-transition metal composite from the admixture;
    heat treating the carbon-transition metal composite; and
    removing the transition metal from the heat-treated carbon-transition metal composite,
wherein the support comprises a core, a graphite layer disposed on a surface of the core, and
wherein the graphite layer is crystalline; wherein the catalyst is in the fuel cell;

wherein the support comprises a first pore having an average pore size of less than about 2 nm, and a second pore having an average pore size of about 2 nm to 50 nm, and
wherein the support satisfies Formula 1, $$\frac{V_2}{V_0} \times 100 \geq 40 \qquad \text{[Formula 1]}$$

where $V_0$ is a total pore volume of the support, and $V_2$ is a volume of the second pore.

8. The method of claim 7, wherein the amorphous carbon particle comprise activated carbon, carbon black, carbon nanotubes, graphene, or combinations thereof.

9. The method of claim 7, wherein the preparing of the dispersion comprises:
    preparing a first admixture comprising the amorphous carbon particle and a first solvent;
    adjusting a pressure of the first admixture to about 600 to 1,500 bar; and
    dispersing the amorphous carbon particle by causing the fluid to pass through a nozzle having a diameter of about 50 to 200 μm at a flow rate of about 50 to 500 ml/min,
wherein the dispersing is performed one or more times to prepare the dispersion.

10. The method of claim 9, wherein, after dispersing the amorphous carbon particle, the dispersion is treated by replacing the first solvent with a second solvent comprising of acetone, ethanol, or combinations thereof.

11. The method of claim 7, wherein the transition metal comprises one or more selected from the group consisting of iron (Fe), nickel (Ni), cobalt (Co), manganese (Mn), ruthenium (Ru), iridium (Ir), tungsten (W), and titanium (Ti).

12. The method of claim 7, wherein the salt of the transition metal is added in an amount of about 200 to 1,000 parts by weight based on 100 parts by weight of the amorphous carbon particle.

13. The method of claim 7, wherein the carbon-transition metal composite is obtained by reacting the admixture for about 5 to 24 hours while stirring the admixture at a temperature of about 60° C. to 120° C.

14. The method of claim 7, wherein the carbon-transition metal composite is heat-treated in a temperature of about 700° C. to 1,500° C. in an inert gas atmosphere for about 1 hour to 12 hours.

15. The method of claim 7, wherein the heat-treated carbon-transition metal composite is treated with an acid solution at a temperature of about 60° C. to 120° C. for about 6 to 48 hours to remove the transition metal.

16. The method of claim 7, wherein the graphite layer has a thickness in a range of about 1 to 10 nm.

17. The method of claim 7, wherein the graphite layer has an interlayer distance ($d_{002}$) of about 3.70 Å or less.

18. The method of claim 7, wherein the graphite layer comprises crystallites having a vertical size Lc in a range of about 13.0 to 13.7 Å and a horizontal size (La) in a range of about 42.4 to 100.5 Å.

19. The method of claim 8, wherein the total pore volume of the support is about 0.78 $cm^3/g$ or greater.

* * * * *